United States Patent [19]

Blanton, Jr.

[11] 4,239,742
[45] Dec. 16, 1980

[54] PROCESS FOR IMPROVING A GAS CONTAINING A MINOR AMOUNT OF SULFUR DIOXIDE IMPURITY AND PRODUCING A HYDROGEN SULFIDE-RICH GAS

[75] Inventor: William A. Blanton, Jr., Woodacre, Calif.

[73] Assignee: Chevron Research Company, San Francisco, Calif.

[21] Appl. No.: 919,207

[22] Filed: Jun. 26, 1978

[51] Int. Cl.$^3$ .................. C01B 17/16; C01B 17/00; B01J 8/00
[52] U.S. Cl. .................................. 423/563; 423/244
[58] Field of Search .............. 423/244 A, 244 R, 563, 423/564

[56] References Cited

U.S. PATENT DOCUMENTS

| | | | |
|---|---|---|---|
| 3,438,728 | 4/1969 | Grantham | 423/563 |
| 3,501,897 | 3/1970 | Van Helden et al. | 423/244 |
| 3,574,545 | 4/1971 | Grantham | 423/563 |
| 3,778,501 | 12/1973 | Lang et al. | 423/244 R |
| 3,816,597 | 6/1974 | Smith | 423/244 |
| 3,989,798 | 11/1976 | Greene et al. | 423/244 A |

*Primary Examiner*—O. R. Vertiz
*Assistant Examiner*—Gary P. Straub
*Attorney, Agent, or Firm*—D. A. Newell; R. H. Davies; W. D. Reese

[57] ABSTRACT

A process is provided for adsorbing sulfur dioxide impurity from an impure gas and producing a hydrogen sulfide-rich gas. In the process, a first adsorbate containing oxidized sulfur is produced by contacting the impure gas with an adsorbent comprising a composite of an alumina support and sodium and vanadium oxides. A second adsorbate containing reduced sulfur is produced by contacting said first adsorbate with carbon monoxide. A gas rich in hydrogen sulfide is then produced by contacting said second adsorbate with water vapor at a temperature in the range 120° C. to 815° C.

7 Claims, 1 Drawing Figure

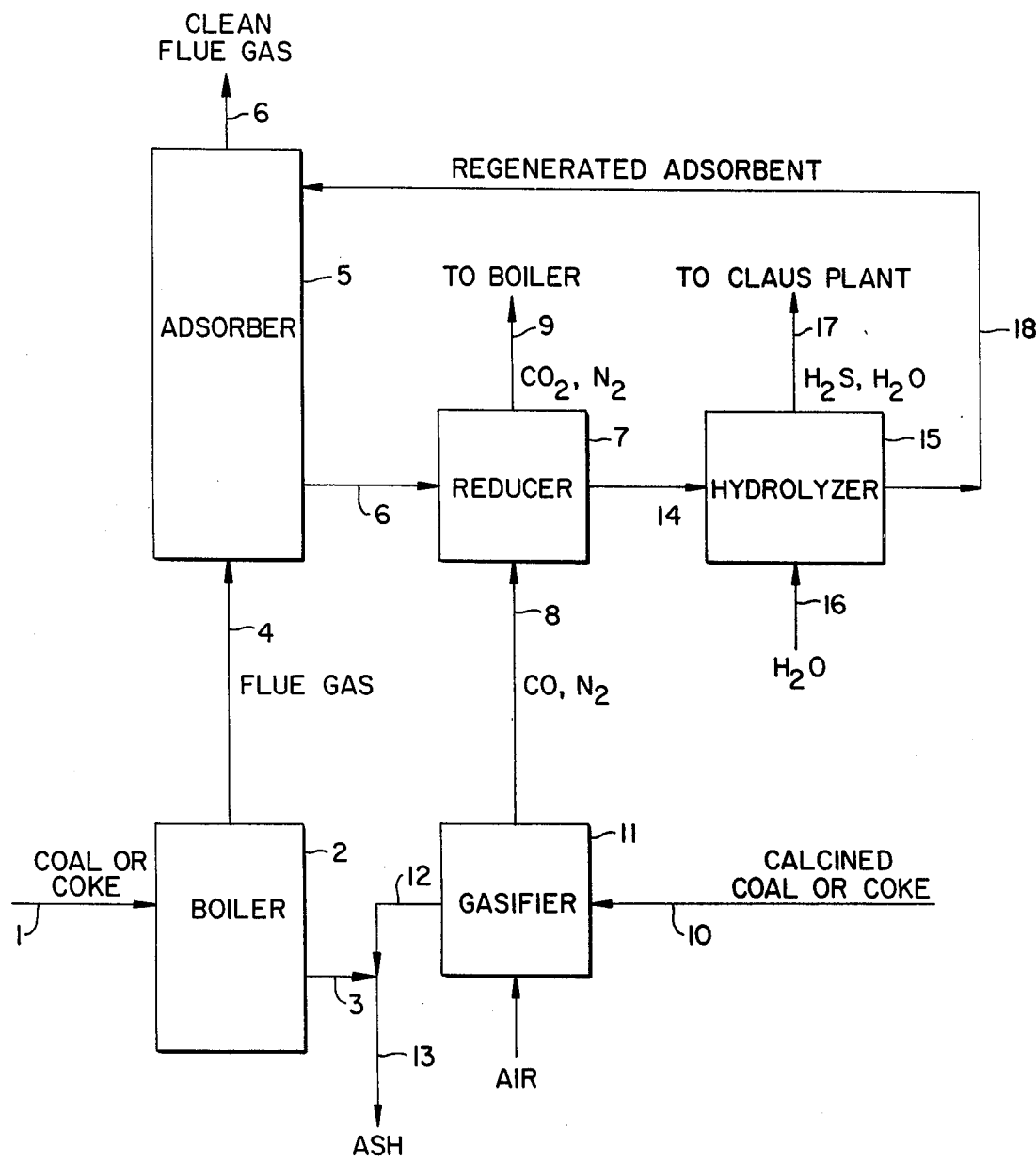

PROCESS FOR IMPROVING A GAS CONTAINING A MINOR AMOUNT OF SULFUR DIOXIDE IMPURITY AND PRODUCING A HYDROGEN SULFIDE-RICH GAS

BACKGROUND OF THE INVENTION

This invention relates to a process for adsorbing sulfur dioxide impurity from a gas. More particularly, it relates to improving an impure gas and producing a hydrogen sulfide-rich gas.

Even as a minor component in a gas, sulfur dioxide is an obnoxious and harmful impurity. Its effective removal from a gaseous mixture which normally must be vented to the atmosphere is a continuing problem. There is a need for an efficient and economic means for removing sulfur dioxide impurity from a gas, especially for a regenerative adsorbent system wherein oxidized sulfur is converted to reduced sulfur suitable for use as feed to a Claus sulfur plant and the like. The present invention provides an effective solution to the problem.

SUMMARY OF THE INVENTION

A process is provided for improving a gas containing sulfur dioxide impurity which comprises:

(1) producing (i) an adsorbate containing oxidized sulfur and (ii) a first effluent gas having, relative to said feed gas, a reduced sulfur dioxide content by contacting said feed gas with an adsorbent under sulfur dioxide adsorbing conditions, said adsorbent comprising a composite of sodium and vanadium as oxides or vanadate salts and an alumina support;

(2) producing an adsorbate containing reduced sulfur by contacting said oxidized sulfur-containing adsorbate at a temperature in the range of about 370° to 815° C. with a gas consisting essentially of carbon monoxide; and (3) producing a second effluent gas rich in hydrogen sulfide by contacting said reduced-sulfur-containing adsorbate with water vapor at a temperature in the range of about 90° to 815° C.

A major aspect of the present invention was a surprising discovery. Thus, it was found that so long as a reducing-gas stream comprising carbon monoxide having no substantial content of water vapor was contacted with an adsorbate containing oxidized sulfur, the effluent gas containing residual carbon monoxide contained little or no hydrogen sulfide and an adsorbate containing reduced sulfur was produced. A yet further aspect was the discovery that a hydrogen sulfide-rich effluent gas stream was produced when the adsorbate containing reduced sulfur was contacted with a gas rich in water vapor. These discoveries provide a twofold advantage. First, the effluent gas during an oxidized-sulfur reducing step is not contaminated with hydrogen sulfide and may be conveniently disposed of, for example, by combusting. Second, a hydrogen sulfide-rich gas stream without contaminating amounts of carbon monoxide is produced. Such a stream is especially suitable, for example, as feed for a Claus plant or the like.

By "sulfur dioxide adsorbing conditions" as used herein is meant contacting at (1) a temperature in the range of from about 90° C. to 345° C., (2) a pressure in the range of from about 0.8 to 5 atmospheres, and (3) a space velocity, volume of gas per bulk volume of adsorbent per hour, in the range of from about 500 to 40,000. Preferred sulfur dioxide adsorbing conditions include contacting at (1) a temperature in the range 120° to 260° C., (2) a pressure in the range 1 to 1.5 atmospheres, and (3) a V/V/Hr in the range 1000 to 20,000.

EMBODIMENT

The FIGURE is a schematic process flow diagram representing a preferred embodiment of the invention.

A sulfur-containing coal or coke fuel is delivered by any suitable means, for example a conveyor system via 1 to boiler unit 2, wherein the fuel is typically combusted and steam, an effluent combustion or flue gas containing sulfur dioxide impurity and residual ash are produced. Via lines 3 and 4 the ash and flue gas, the latter at a temperature of about 150° C., are withdrawn from unit 2.

Because the sulfur dioxide content of the flue gas exceeds a permissible level, for example about 75 ppmw, the flue gas must be desulfurized. To this end, via line 4 the flue gas is passed to adsorber unit 5 wherein it is contacted with a sulfur dioxide adsorbent at (1) a temperature of about 150° C., (2) a pressure of about 1.03 atmospheres, and (3) a space velocity of about 10,000 V/V/Hr. The resulting adsorption of sulfur dioxide, for convenience, may be represented as follows:

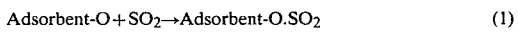

Adsorbent-O + SO$_2$ → Adsorbent-O.SO$_2$     (1)

The adsorbent in unit 5 is a moving bed of a composite of sodium vanadate disposed upon porous alumina having (1) a weight ratio of vanadium to alumina of about 1 to 20, (2) a mol ratio of sodium to vanadium of about 3 to 1, (3) a surface area of about 150 m$^2$/g, and (4) a particle size of about 0.6 cm. This adsorbent is conveniently and typically prepared by impregnating a commercially available alumina with an aqueous solution of sodium ortho vanadate followed by drying.

Via line 6, treated flue gas is withdrawn from unit 5 and vented to the atmosphere. The sulfur dioxide content of the treated gas is determined by means of a conventional monitoring unit, which is not shown. Regenerated adsorbent is added via line 18 and spent adsorbent is withdrawn via line 6 at a rate sufficient to maintain the sulfur dioxide content of the flue gas below a predetermined level, for example, 75 ppmw.

For the regeneration, the spent adsorbent (adsorbate containing oxidized sulfur, e.g., +4 and/or +6 sulfur) is withdrawn from unit 5 and passed via line 6 to reducer unit 7 wherein at a temperature of about 480° C. it is converted to an adsorbate containing reduced (−2) sulfur in a reaction which may conveniently be represented as follows:

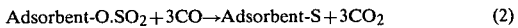

Adsorbent-O.SO$_2$ + 3CO → Adsorbent-S + 3CO$_2$     (2)

This conversion is achieved by introducing a suitable hot gas stream containing carbon monoxide via line 8 into reducer 7 into contact with the spent adsorbent. The effluent gas stream contains carbon monoxide and traces of sulfur-containing gases. In order to clean it up for venting, this stream is combusted in unit 2.

The carbon monoxide stream required for the regeneration is obtained by typical partial oxidation of calcined coal or coke which is introduced to gasifier 11 via line 10. Reduced ash produced in gasifier 11 is withdrawn via line 12 for disposal, together with ash from line 3 produced in unit 2 for disposal via line 13.

The adsorbate containing reduced sulfur resulting from the reduction carried out in reducer 7 is withdrawn via line 14 and passed to hydrolyzer 15, wherein it is contacted with low-pressure steam introduced via line 16. A rapid reaction ensues upon the contacting in which a hydrogen sulfide-rich gas is generated. The reaction may conveniently be summarized as follows:

$$\text{Adsorbent-S} + H_2O \rightarrow \text{Adsorbent-O} - H_2S \quad (3)$$

Via line 17, this gas is withdrawn from hydrolyzer 15 for use as desired, for example as feed to a Claus plant or the like, and via line 18, regenerated adsorbent is recycled to adsorber 5.

Feed Gas

Gases in general which have in the past normally been vented to the atmosphere and which contain sulfur dioxide as an impurity (usually less than about 5 volume percent thereof is sulfur dioxide) are satisfactory feedstocks for the process of the invention and are contemplated for such use. Preferred feedstocks are effluent gases (waste gas) resulting from combusting (or calcining), a sulfur-containing fuel, for example coal, fuel oil, refinery residua, coke and the like. Representative such gases include off-gas streams, steam boiler combustion, incinerator and the like industrial gaseous effluent streams containing sulfur dioxide impurity. Typically, such gases have a sulfur dioxide content in the 100 ppmw to 5 volume percent range.

Adsorbent

Adsorbents satisfactory and contemplated for use herein include composites comprising a minor fraction of sodium and vanadium as oxides and/or vanadate salts, and a major fraction of a porous support, preferably containing at least 80 weight percent of alumina, and more preferably alumina. Typical adsorbents are described in U.S. Pat. Nos. 3,501,897 and 3,816,597. Also see my copending application U.S. Ser. No. 861,461, filed Dec. 16, 1977, now abandoned which is hereby referred to and incorporated herein by reference.

The relative portions of the components of the adsorbent composite may vary. In general, better results are achieved when the weight ratio of vanadium to support is in the range 1 to 50-10, preferably 1 to 40-15, and more preferably 1 to 20, and the molar ratios of sodium oxide to vanadium pentoxide is in the range 1:2 to 12:1, preferably 1:1 to 6:1, and more preferably 3 to 1, respectively.

The support must be porous and should have a surface area of at least 20 m$^2$/g and usually is in the range 20 to 400 m$^2$/g.

Reducing Step

Conditions satisfactory, in general, and contemplated for use in the reducing step herein, include a temperature in the range of from about 370° C. to 650° C., preferably 425° C. to 540° C., more preferably about 480° C.

A gas, in general, comprising carbon monoxide and inert diluents, such as nitrogen, carbon dioxide and the like, is satisfactory and contemplated for use in the reducing step herein. It may also contain a minor amount, for example below about 1 volume percent, of water vapor, although a substantially (less than 500 ppmw) anhydrous gas is preferred. A representative and preferred reducing gas is one produced by a typical partial oxidation of calcined coal or coke; another is a gas containing about 30 volume percent of carbon monoxide and the balance being nitrogen and carbon dioxide.

Hydrolysis Step

Conditions satisfactory, in general, and contemplated for use in the hydrolysis step herein, include (1) a temperature in the range of from about 120° to 815° C., preferably 150° to 540° C., and more preferably 150° C. to 480° C. (for example resulting from quenching or cooling the adsorbate containing reduced sulfur to about 150° C.), (2) a pressure in the range of from about atmospheric to 10 atmospheres, preferably at or below that of a typical low-pressure steam, and (3) use of a water spray or, preferably, low-pressure steam.

EXAMPLES

The following examples are provided for the further description of the invention, there being no intent therein to limit the scope of the invention.

EXAMPLES 1-6

In the following examples, the carrier was a porous alumina having (1) a surface area of about 200 m$^2$/g; (2) pore volume of about 0.6 cc per gram, of which about 75% of the pore volume was provided by pores in the 80- to 150-Angstrom-diameter range; and (3) a 24- to 42-mesh particle size. In each example, the adsorbent was prepared by the impregnation method using concentration of aqueous sodium ortho-vanadate or a mixture of sodium ortho-vanadate and trisodium phosphate. In each case, the wet or impregnated carrier was dried by maintaining it at 150° C. and finally any remaining volatiles were removed by maintaining the dried adsorbent at 482° C. and in a stream of nitrogen gas until, for practical purposes, constant weight was reached.

In a standard test, each adsorbent in a fixed bed was subjected to alternate adsorbing and regenerating cycles until its capacity (defined as SO$_2$-loading when the effluent stream reaches a sulfur dioxide content of 0.05 volume percent) had leveled out.

In the adsorbing cycle of the test, the sulfur dioxide-containing gas used had the following composition:

| Component | %, Volume |
|---|---|
| SO$_2$ | 0.2 |
| CO$_2$ | 15 |
| O$_2$ | 2 |
| H$_2$O | 6 |
| N$_2$ | Balance |

The conditions for the adsorbing cycle included a temperature of 150° C. and a space velocity of 5000 V/V/Hr$^{-1}$.

In the regenerating cycle, the spent bed was maintained at 482° C. and a regenerating gas consisting of 10 volume percent CO in nitrogen was passed through the bed for 1 to 2 hours. The reduced adsorbent was then contacted with the same water vapor containing gas used in the adsorption cycle. Evolution of H$_2$S was virtually complete in less than 12 minutes.

The test results are listed in the Table below.

TABLE

| Example No. | Vanadium, Wt. % | Added Component Kind | Added Component Wt. % | Capacity, Wt. % SO$_2$ |
|---|---|---|---|---|
| 1 | 5 | None | — | 6.0 |

TABLE-continued

| Example No. | Vanadium, Wt. % | Added Component Kind | Added Component Wt. % | Capacity, Wt. % SO$_2$ |
|---|---|---|---|---|
| 2 | 5 | P | 1.1 | 9.7 |
| 3 | 5 | P | 2.2 | 8.3 |
| 4 | 5 | P* | 2.0 | 3.0 |
| 5 | 5 | P* | 1.0 | 3.4 |

*Phosphorus in the form of aqueous trisodium phosphate added separately to alumina carrier and calcined prior to impregnation using sodium vanadate solution.

These data demonstrate that the addition of an alkali metal salt of an oxyacid of phosphorus enhances the sulfur dioxide capacity of sulfur dioxide adsorbents comprising a porous alumina carrier and an alkaline earth salt of an oxyacid of vanadium, for example sodium phosphovanadate.

These data also demonstrate that significant capacities for SO$_2$ adsorption are maintained when using the regeneration procedure described herein.

What is claimed is:

1. A process for removing sulfur oxides from a feed gas, comprising the steps of:
   (a) adsorbing sulfur oxides from said feed gas into an adsorbent at adsorption conditions including a temperature of about 90° C. to about 345° C., said adsorbent comprising a composite of sodium and vanadium as oxides or vanadate salts and a porous support including at least 80 weight percent alumina, and withdrawing the resulting gas from contact with said adsorbent;
   (b) converting sulfur in adsorbed sulfur oxides to sulfide form in said adsorbent by contacting said adsorbent with a reducing gas comprising carbon monoxide and containing less than 1 volume percent water at a temperature of about 370° C. to about 815° C.; and
   (c) forming hydrogen sulfide by contacting the absorbent resulting from step (b) with steam at a temperature of about 90° C. to about 815° C.

2. A process as in claim 1 wherein said feed gas is a waste gas resulting from calcining or combusting a sulfur-containing fuel.

3. A process as in claim 1 wherein (I) said sulfur dioxide adsorbing conditions include a pressure in the range of from about 1 to 1.5 atmospheres and a space velocity in the range of from about 1000 to 20,000; (II) said adsorbent has (1) a weight ratio of vanadium to support in the range of from about 1 to 50–10, (2) a mol ratio of Na$_2$O to V$_2$O$_5$ in the range of from about 1:2 to 12:1, and (3) a surface area in the range of from about 20 to 400 m$^2$/gram; (III) said reducing gas is substantially anhydrous; and (IV) said hydrogen sulfide formation is carried out (1) at a temperature in the range of from about 120° to 650° C., (2) at a pressure of from about 1 to 10 atmospheres, and (3) using a water spray or low-pressure steam.

4. A process as in claim 3 wherein (1) said feed gas is a combustion gas, (2) said range of weight ratio of vanadium to support is 1 to 40–15, (3) said range of molar ratio of Na$_2$O to V$_2$O$_5$ is 1:1 to 6:1, (4) said reducing gas is produced by partially oxidizing calcined coal or coke, and (5) hydrogen sulfide is formed at 120° C. to 480° C. using low-pressure steam.

5. A process according to claim 1 wherein at least one of said feed gas, said reducing gas and said steam is contacted with a moving bed of said adsorbent.

6. A process according to claim 1 wherein residual carbon monoxide in said reducing gas in burned to supply heat after said reducing gas is withdrawn from contact with said adsorbent.

7. A process according to claim 1 wherein said hydrogen sulfide is used as a feed to a Claus plant.

* * * * *